(12) United States Patent
Payne et al.

(10) Patent No.: US 11,705,089 B2
(45) Date of Patent: Jul. 18, 2023

(54) DISPLAY SPATIAL BRIGHTNESS CONTROL

(71) Applicant: TEXAS INSTRUMENTS INCORPORATED, Dallas, TX (US)

(72) Inventors: Robert Floyd Payne, McKinney, TX (US); Harsh Dinesh Jhaveri, Wylie, TX (US); Jeffrey Matthew Kempf, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 78 days.

(21) Appl. No.: 17/224,399

(22) Filed: Apr. 7, 2021

(65) Prior Publication Data

US 2021/0312885 A1 Oct. 7, 2021

Related U.S. Application Data

(60) Provisional application No. 63/006,449, filed on Apr. 7, 2020.

(51) Int. Cl.
    *G09G 5/10* (2006.01)
    *G02B 27/01* (2006.01)
    *G02B 26/08* (2006.01)

(52) U.S. Cl.
    CPC ........... *G09G 5/10* (2013.01); *G02B 27/0172* (2013.01); *G02B 2027/014* (2013.01); *G09G 2320/0646* (2013.01)

(58) Field of Classification Search
    USPC ........................................................ 345/694
    See application file for complete search history.

(56) References Cited

U.S. PATENT DOCUMENTS

| | | | |
|---|---|---|---|
| 6,456,421 B1* | 9/2002 | Chapnik | H04N 1/508 359/223.1 |
| 10,032,402 B2 | 7/2018 | Kempf | |
| 2003/0227577 A1* | 12/2003 | Allen | H04N 9/3155 348/742 |
| 2006/0071888 A1* | 4/2006 | Lee | G09G 3/3233 345/82 |
| 2006/0071936 A1* | 4/2006 | Leyvi | G09G 3/342 345/589 |
| 2008/0084510 A1* | 4/2008 | Toyooka | H04N 9/3155 348/E9.027 |
| 2009/0147033 A1* | 6/2009 | Arai | G09G 3/346 345/697 |
| 2010/0265228 A1* | 10/2010 | Kimura | G09G 3/3233 345/207 |
| 2012/0120089 A1* | 5/2012 | Byun | G09G 3/3406 345/589 |
| 2012/0154370 A1* | 6/2012 | Russell | G09G 3/346 382/232 |

(Continued)

*Primary Examiner* — Chineyere D Wills-Burns
(74) *Attorney, Agent, or Firm* — Michelle F. Murray; Frank D. Cimino

(57) ABSTRACT

A system includes a spatial light modulator (SLM) configured to project an image. The system also includes a controller coupled to the SLM. The controller is configured to receive the image and determine a brightness level of the image. The controller is also configured to enforce a brightness limit on the image responsive to the brightness level, to produce a reduced image. The controller is configured to instruct a display to display the reduced image.

20 Claims, 2 Drawing Sheets

(56) References Cited

U.S. PATENT DOCUMENTS

| | | | |
|---|---|---|---|
| 2013/0050390 A1* | 2/2013 | Curry | B41J 2/447 347/248 |
| 2014/0253605 A1* | 9/2014 | Border | G02B 27/017 345/690 |
| 2015/0146185 A1* | 5/2015 | Williamson | G03F 7/70225 359/364 |
| 2016/0270656 A1* | 9/2016 | Samec | A61B 5/361 |
| 2017/0154586 A1* | 6/2017 | Morimoto | G09G 3/3406 |
| 2019/0295504 A1* | 9/2019 | Xiong | G09G 5/10 |
| 2020/0058109 A1* | 2/2020 | Rhyu | G09G 3/3426 |
| 2020/0082761 A1* | 3/2020 | Kim | G09G 3/3233 |
| 2020/0143770 A1* | 5/2020 | Tai | G09G 3/3406 |
| 2020/0202066 A1* | 6/2020 | Bodera | G06F 16/9558 |
| 2021/0193047 A1* | 6/2021 | Kwon | G09G 3/3258 |
| 2021/0304693 A1* | 9/2021 | Lee | G09G 3/3607 |
| 2022/0247982 A1* | 8/2022 | Kroll | H04N 9/317 |

* cited by examiner

DISPLAY SPATIAL BRIGHTNESS CONTROL

CROSS-REFERENCE TO RELATED APPLICATIONS

The present application claims priority to U.S. Provisional Patent Application No. 63/006,449, which was filed Apr. 7, 2020, is titled "Controlling Spatial Brightness of a Display," and is hereby incorporated herein by reference in its entirety.

BACKGROUND

Imaging systems are used for a variety of applications, such as projectors, displays, automotive heads-up displays (HUDs), near-eye displays, augmented reality (AR) systems, virtual reality (VR) systems, and many others. Some imaging systems use spatial light modulators (SLMs) to modulate a beam of light to produce an image, such as by modulating the intensity of the beam of light. One type of SLM is a digital micromirror device (DMD). A DMD is a micro-electrical-mechanical system (MEMS) that has on its surface an array of several hundred thousand or millions of microscopic mirrors. Each micromirror corresponds to a pixel in an image that is projected onto the micromirrors and then reflected from the micromirrors to a display. Other types of SLMs are liquid crystal display (LCD) systems, liquid crystal on silicon (LCoS) systems, or microLED (light emitting diode) displays.

SUMMARY

In accordance with at least one example of the description, a method includes receiving, by a controller, an image. The method also includes determining a brightness level of the image. The method includes reducing an attribute of the image responsive to the brightness level being above a threshold, to produce a reduced image. The method also includes instructing, by the controller, a display to display the reduced image.

In accordance with at least one example of the description, a system includes a spatial light modulator (SLM) configured to project an image. The system also includes a controller coupled to the SLM. The controller is configured to receive the image and determine a brightness level of the image. The controller is also configured to enforce a brightness limit on the image responsive to the brightness level, to produce a reduced image. The controller is configured to instruct a display to display the reduced image.

In accordance with at least one example of the description, an SLM is configured to display an image. An optical system is optically coupled to the SLM, the optical system configured to project the image. A controller is coupled to the SLM. The controller is configured to determine an identification (ID) of the SLM. The controller is also configured to receive the image. The controller is configured to determine a brightness level of the image, where the brightness level is based at least in part on the ID of the SLM. The controller is configured to enforce a brightness limit on the image responsive to the brightness level and the ID.

DETAILED DESCRIPTION

Figure 1:
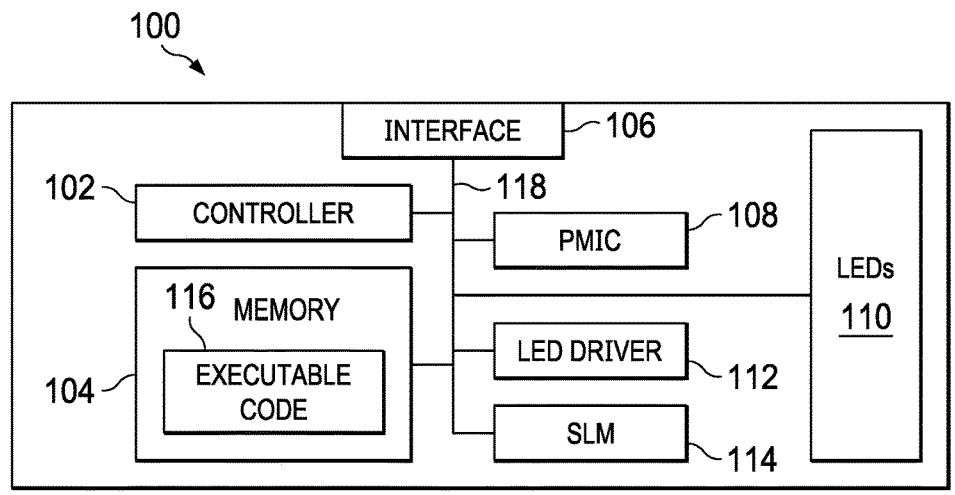
FIG. 1 is a block diagram of an SLM chipset in accordance with various examples.

SLMs are used in a variety of applications. Some applications are designed to use the full brightness of the SLM, such as a projector for a conference room or a theater. The full brightness of the SLM provides a high definition image with a high dynamic range. Other applications use a lower light output or brightness, such as a near-eye display or a HUD. These other applications may display information on a limited portion of the display area, or they may display information at a lower brightness. These low brightness applications may rarely use the full brightness capabilities of the SLM. The same SLM is useful for the high brightness application and the low brightness application. A manufacturer of SLMs may want to charge a lower price for an SLM used in a low brightness application, and charge a higher price for a similar SLM used in a high brightness application. However, a customer could purchase a lower-priced SLM and use it in a high brightness application, thereby defeating the pricing structure. Also, an SLM for a low-brightness application may include a different thermal dissipation allowed for a given lifespan compared to an SLM in a high brightness application. The ability to pull heat from the device through means such as heat-sinking or airflow, or the ability to transfer heat from the mirrors themselves to the ambient environment via alternative packaging techniques, may be different for low brightness applications compared to high brightness applications.

In examples herein, a single SLM chipset, or different SLM chipsets with minor differences, are useful in a variety of applications. The SLM chipsets may be priced differently based on the application. SLM chipsets for high brightness applications may command a premium price due to enhanced power handling capabilities or expected device lifetimes, while SLM chipsets for lower brightness applications may be sold at a lower price. The lower price may be in part due to differences in construction of the SLM chipsets. These differences in construction for different SLM chipsets may include different power dissipation abilities, or differences in other features such as image quality, device lifetime, or allowable defect density. To reduce the possibility of a less expensive or low brightness SLM chipset being purchased and deployed in a high brightness application, examples herein control the allowable spatial brightness of the low brightness SLM chipsets. For low brightness applications, the total image power (e.g., a brightness level) may be limited to a certain percentage of full brightness. A controller in the SLM chipset may monitor the images for display and reduce the brightness level or reduce fidelity to ensure the brightness level of the image remains below a brightness limit. In another example, an SLM chipset may have an identification (ID) function available that identifies its capabilities (e.g., full brightness or limited brightness). A controller may read the ID and manage the SLM chipset according to the capabilities associated with the ID. The ID may indicate a maximum picture level in one example, described below. Also, the examples herein introduce little to no additional costs on existing SLM chipsets, because existing SLM controllers use algorithms to monitor brightness, and these algorithms may be extended and/or modified to limit brightness for low brightness applications, in accordance with examples described herein.

In an example, systems described herein may be used in a near-eye display. Near-eye displays are head-mounted or wearable displays. A near-eye display creates a virtual image in the field of view of one or both eyes. Immersive near-eye displays block a user's view of the real world and create a large field of view image, typically 30-60 degrees for cinema glasses and 90+ degrees for virtual reality displays. These products can act as a user's personal cinema or gaming environment. See-through near-eye displays leave the user's view of the real world open and create either a transparent image or a very small opaque image that blocks only a small portion of the user's peripheral vision. The see-through category may have two applications: augmented reality and smart glasses. Augmented reality headsets typically have a 20 to 60 degree field of view and overlay information and graphics on top of the user's view of the real world. Smart glasses typically have a smaller field of view and a display at which the user glances periodically rather than looking through the display continuously. Near-eye displays may be used in a variety of applications in both industrial and consumer markets. Near-eye displays may be used for warehouse management, equipment repair and assembly, remote control of drones or robots, or virtual reality training simulators. Near-eye displays may also be used for augmented reality gaming, outdoor activity monitors, 3D gaming, and 3D movies.

Systems described herein may also be used for automotive applications, such as HUDs and headlamps. Exterior and interior display and light applications may be realized using examples herein. As an example, an image may be projected onto a windshield to provide information to the driver. The driver's situational awareness may be enhanced and the driving experience improved with an automotive HUD. Also, headlight systems may increase brightness for drivers on the road while reducing the glare of oncoming traffic or reflections from high-gloss traffic signs. Customizable beam patterns include the ability to partially or fully dim individual pixels, creating headlight systems that allow drivers to keep their high-beams on while operating their vehicle in sub-par conditions.

Systems described herein may also be used for 3D printing applications. In 3D printing, a model of the object to be printed is converted into a series of cross-sectional slices that are sent to the 3D printer. For each cross-sectional slice of the object, the SLM projects patterned light that selectively exposes and hardens the resin. Because an entire layer is exposed with a single pattern, fast build speeds are achieved independent of layer complexity. Projection optics can also be used to control the resolution on the image plane and adjust the layer thickness, leading to smooth and accurate finished parts.

FIG. 1 is a block diagram of an SLM chipset 100 in accordance with various examples herein. SLM chipset 100 includes a controller 102, memory 104, interface 106, power management integrated circuit (PMIC) 108, light emitting diodes (LEDs) 110, LED driver 112, SLM 114, executable code 116, and bus 118. SLM chipset 100 may include other components in other examples. In some examples, some components, such as PMIC 108 and LED driver 112, may be integrated together.

Controller 102 manages many of the operations of SLM chipset 100. Controller 102 may be one or more controllers or one or more processors in some examples. Controller 102 also controls the pattern of the elements of SLM 114. Video or image data for display is received by SLM chipset 100 via interface 106, for example, from an external storage device or video source. Memory 104 may store executable code, such as executable code 116, for monitoring brightness of the video or image data, in accordance with examples herein. An algorithm may be embodied in executable code 116. Executable code 116 may run on controller 102. PMIC 108 provides power for the components in SLM chipset 100. LED driver 112 provides a configurable current to LEDs 110 to control the light output of LEDs 110. SLM 114 modulates light to produce an image for display, and is configured to project the image for display. In one example, SLM 114 is a DMD, which receives light from LEDs 110 and reflects the light to produce an image on a display. Bus 118 couples the components of SLM 100 to one another and provides for communication between the components.

In one example herein, controller 102 (or a different controller or processor) executes executable code 116 in memory 104 to monitor the brightness level of the image that is sent to SLM 114 for display. Brightness may be monitored by calculating an average picture level (APL) of the image for display. The APL is the percentage of the display that is on and bright compared to a full white display. With an SLM 114 that uses LEDs 110 to display images, red, green, and blue LEDs 110 are used to produce colored light that is reflected by SLM 114 for display. To produce a completely white image on the display, each LED 110 is on and fully reflected by SLM 114. The APL for a full white image would be 100%. A completely black image on the display may be produced by no light being reflected for display, and the APL would be 0%. For a completely red image, blue image, or green image, the APL would be 33%. As another example, if half of the display is fully white and half of the display is fully black, the APL would be 50%. Monitoring the APL allows controller 102, LED driver 112, or another component of SLM chipset 100 to limit the APL to a maximum allowed brightness limit, known herein as the maximum picture level (MPL). Limiting the APL limits the brightness of the display. By limiting the APL, some SLM chipsets 100 may be limited to low brightness applications and restricted from use in high brightness applications. In one example, executable code 116 may embody a content-adaptive illumination control (CAIC) algorithm that calculates the APL of each frame. The CAIC algorithm embodied in executable code 116 processes video content on a frame-by-frame basis, and calculates the APL for each frame as part of that processing. Therefore, the CAIC algorithm is useful to monitor the APL and enforce an MPL.

Controller 102 manages the operation of components in SLM chipset 100. Controller 102 may monitor the APL based on an analysis of the images sent to SLM chipset 100 for display. Controller 102 provides instructions to SLM 114 that produce the image for display. Therefore, controller 102 may limit the brightness of the image for display by executing any appropriate executable code 116 to monitor and/or restrict the brightness of the image, such as the CAIC algorithm. For example, the MPL may be set at 25%. With an MPL of 25%, 25% of the display may display a full brightness image while the other 75% of the display is restricted and cannot display an image. Alternatively, 50% of the display may display an image with 50% brightness, while the other 50% of the display cannot display an image. As another alternative, the entire display may display an image, but with only 25% maximum brightness on any portion of the display. In another example, if the CAIC algorithm determines that the brightness level of an image exceeds the MPL, the brightness of some of the pixels in the image may be reduced by controller 102 so the image that is ultimately provided to SLM 114 for display is a reduced image that has a brightness level below the MPL. In this manner, controller 102 may monitor the APL and appropriately restrict the images displayed, to prevent the APL from surpassing the MPL.

In examples herein, SLM chipsets 100 restricted to low brightness applications may still provide images at full brightness and full dynamic range. However, those full brightness images are restricted to a subsection of the display. Therefore, a low brightness (and lower cost) SLM chipset 100 may be suitable for a HUD or a near-eye display, where only a subsection of the display area is used to display information. A low brightness SLM chipset 100 may be purchased at a lower price than a high brightness SLM chipset 100, which allows SLM chipsets 100 to be used in a wider variety of applications. Customers who purchase low brightness SLM chipsets 100 may be informed of the MPL and any other brightness limits in a datasheet, for example. If SLM chipsets 100 are offered with a variety of different MPLs, the customer can choose an SLM chipset 100 with an MPL that matches the requirements of the customer's application.

Figure 2A:
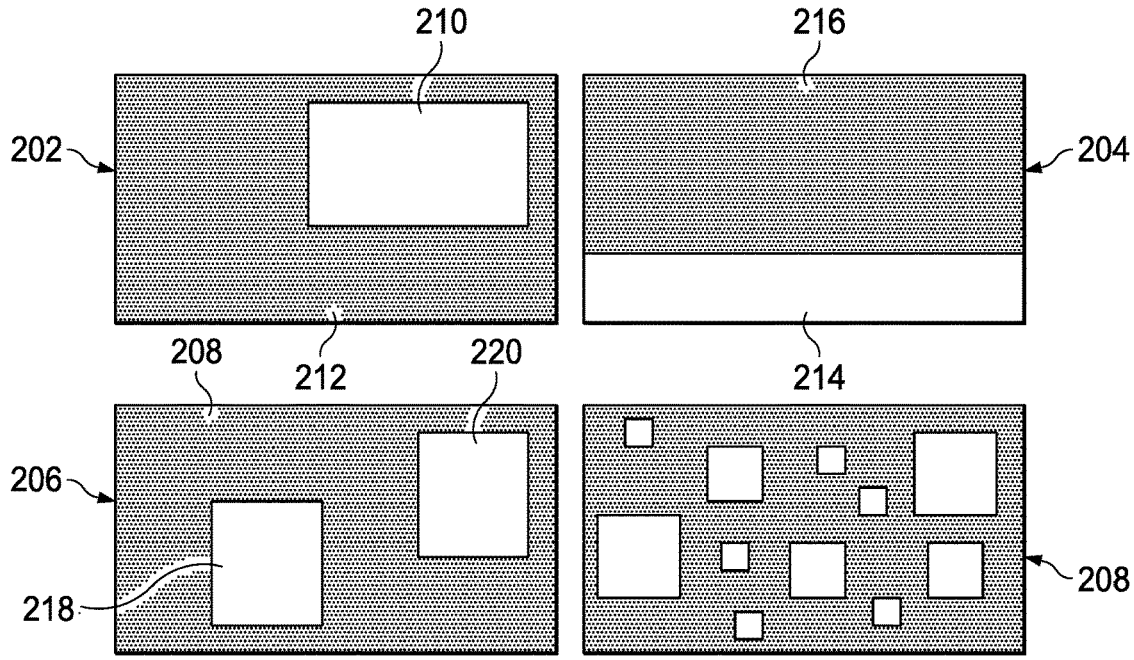
FIG. 2A is a diagram of four images with an average picture level (APL) of 25% in accordance with various examples.

FIG. 2A shows four images with an APL of 25% in accordance with various examples herein. In other examples, a different APL maybe used, such as 10%, 33%, 50%, or any other APL. The images are examples of images that may be displayed on a display using an SLM chipset 100 where a brightness limit is enforced. In these examples, full brightness is indicated by the white or light portions of the images 202, 204, 206, and 208. If SLM chipset 100 has an MPL of 25%, full brightness is allowed on 25% of the display area if the rest of the display area has 0% brightness (e.g., the darker (shaded) image portions in FIG. 2A, which may be black in some examples). Any portions of the display are useful as the high brightness areas.

In image 202, a single white portion 210 has full (100%) brightness. Portion 210 is 25% of the area of image 202. The other 75% of image 202, portion 212, is therefore black and has 0% brightness. The APL of image 202 is 25%.

In image 204, a single white portion 214 has full brightness. Portion 214 is 25% of the area of image 202. The other 75% of image 202, portion 216, is black and has 0% brightness. In image 204, the portion with full brightness is at the bottom of the display. Image 204 provides an example of how an automotive HUD may operate with an MPL. An automotive HUD may display information to a driver on the bottom portion of a windshield, where full brightness is useful. The upper portions of the windshield may rarely be used to display information, and therefore limiting maximum brightness to a portion of the screen is suitable for this application. The APL of image 204 is also 25% in this example.

In image 206, two different portions 218 and 220 have full brightness. In total, portions 218 and 220 cover 25% of image 202, so this configuration also has an APL of 25%. Portion 222 is black with 0% brightness.

Image 208 includes a large number of separate portions of the image at full brightness. The total area of those portions is 25% of the area of image 208, so the APL of image 208 is 25%. Image 208 shows that the bright and dark portions can be distributed about an image in any suitable configuration, so long as the APL does not exceed 25% in this example. For example, a near-eye display may display text or images on numerous small portions of the display at full brightness, while the majority of the area of the display has a low brightness level. As shown in image 208, a number of smaller, bright portions are visible on the display. The rest of the display has an image at a lower brightness. For a near-eye display, a user may want to view text, graphics, or other information on a small portion of the display. As an example, a user may want to see information displayed in the lower left portion of the field of view, with the rest of the field of view unobstructed so that the user can view the real world. In another example, the user may want to see text or graphics in the bottom left, bottom center, and top left of the display, with the rest of the field of view unobstructed. Image 208 shows that images may be placed in small locations throughout the field of view, while a large portion of the field of view remains unobstructed. The text or images may be displayed at high brightness or full brightness, while other portion of the display may have low brightness or not display any images.

Figure 2B:
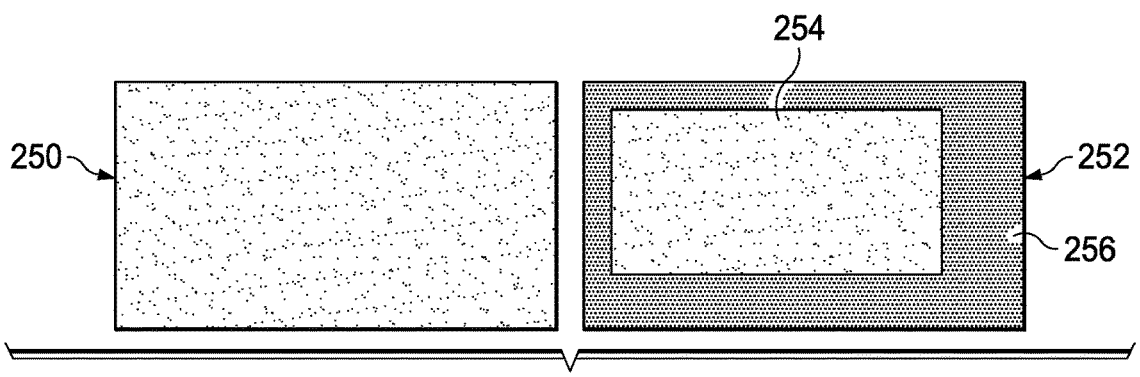
FIG. 2B is a diagram of two images with an APL of 25% in accordance with various examples.

FIG. 2B shows two additional images 250 and 252 with an APL of 25% in accordance with various examples herein. In image 250, the entire display is used to display an image, but the image has a maximum brightness of 25%. Image 250 shows a scenario where the entire display is used, but the brightness is reduced everywhere in image 250. In this example, the brightness of every pixel is 25%, which makes the APL 25%. Image 250 therefore does not exceed the MPL of 25%.

Image 252 is an example of a large portion of an image at reduced brightness, with another portion of the image at 0% brightness. In image 252, portion 254 constitutes approximately 50% of the display area, while portion 256 has 0% brightness for the other 50% of the display area. Because 50% of the display area is used to display an image, portion 254 may have up to 50% brightness, and the system still remains below the MPL of 25%. In other examples, any combination of brightness and display area may be used, as long as the total brightness remains below the MPL. For example, a portion of the screen may be at 100% brightness, another portion at 75% brightness, another portion at 25% brightness, and the rest at 0% brightness. These types of combinations are useful to display different types of data at different brightness levels, while remaining below the MPL for the entire display. Any number of different brightness levels may be used to display data or images, and any number of different portions of the screen may be used to display data or images.

Reducing an attribute of the image, such as the brightness level of the image, is one example for enforcing an MPL in SLM chipset 100. In other examples, dynamic range is an attribute that may be reduced in addition to, or rather than, reducing brightness. Reducing dynamic range is another method to differentiate low brightness SLM chipsets 100 from high brightness SLM chipsets 100. A low brightness SLM chipset 100 may restrict the dynamic range of an input video or image that attempts to exceed the MPL. The reduced dynamic range would produce a reduced image that is a distorted or incomplete image. If the MPL is exceeded, the dynamic range may be reduced below a predetermined limit based on the allowable MPL.

In another example, controller 102 may enforce an MPL with a digital limit imposed on the data sent to an SLM 114 to reduce the brightness of the image. If SLM 114 is a DMD, digital signals are sent to the DMD that indicate which pixels are on and off, and how bright each of those pixels are, to properly display the programmed image with the DMD. The brightness of each pixel is set with a series of bits, with the status of the most significant bit (MSB) of the series of bits having the largest impact on the brightness of the pixel. For example, an MSB may be set to 1 or 0, with 1 used to indicate the MSB is set, and 0 used to indicate the MSB is not set. To limit the brightness and enforce an MPL, the number of MSBs that can be set to 1 for the pixels of an image is restricted. In one example, only 25% of the pixels in a given frame may have an MSB with a value of 1; the rest of the MSBs are set to 0. Those pixels that utilize the MSB may be placed anywhere within the frame. Other bits beside the MSB (such as the second most significant bit) may have no restrictions, or those bits may have some restrictions as well in some examples.

To restrict the number of MSBs that are allowed to be in use at one time to display an image, controller 102 may use a counter that counts the number of MSBs transmitted to SLM 114 for each frame to be displayed. The counter may be embodied in hardware or software, or a combination of the two. As the pixels are transmitted to SLM 114, controller 102 increments a counter for each MSB that is in use. After the counter reaches the limit of MSBs for a given frame, controller 102 would no longer transmit MSBs to SLM 114 for that frame (e.g., the MSBs for each subsequent pixel of that frame would be inactive). Therefore, controller 102 would enforce a limit on the image, and the image would appear distorted if a user attempted to display an image with brightness above a limit, as determined by the number of MSBs in the image. For the next frame to be displayed, the MSB counter would reset, and controller 102 would again send MSBs to SLM 114 until the MSB limit is reached.

In another example, an MPL may be enforced by blanking the display. If a user attempts to display a frame of an image that exceeds the MPL, the controller 102 may instruct SLM 114 to display a blank image on the display. If the next frame does not exceed the MPL, the next frame is displayed without limit. As an alternative, the dynamic range of the image may be reduced rather than blanking the screen if the image exceeds the MPL.

In another example, the attribute that is modified to reduce brightness of the image is the power provided to LED 110. Brightness may be controlled or limited by limiting the power provided to a light source such as LED 110. Controller 102 may control LED driver 112 or LEDs 110 in some examples. Controller 102 may send an instruction to LED driver 112 to reduce power to LEDs 110 if the MPL is exceeded. Reducing power to LEDs 110 reduces the brightness of the image displayed, which enforces the MPL. If another illumination source other than LEDs are used, power may be reduced to that illumination source to reduce the brightness level and produce a reduced image for display. To reduce brightness in other examples, any suitable method is useful to lower the light output of an illumination source.

In some examples, an SLM chipset 100 includes an ID stored in firmware or software. The ID could be hard-coded in read only memory (ROM), encoded in one-time programmable memory, stored in electrically erasable programmable ROM (EEPROM), or encoded and stored using any other appropriate technique. The ID may be unique for that SLM chipset 100, and/or may indicate that the SLM chipset 100 belongs to a specific class of chipset. Each SLM chipset 100 may be assigned to a specific class based on the MPL of that SLM chipset 100. For example, a first class may indicate that the SLM chipsets 100 have a 25% MPL. A second class of SLM chipsets 100 may have an MPL of 35%, while a third class of SLM chipsets 100 has an MPL of 50%. Finally, a fourth class of SLM chipsets 100 may have an MPL of 100%, and this class would be unrestricted in their operation. The ID of an SLM chipset 100 may identify to which of the four classes the SLM chipset 100 belongs. The SLM chipsets 100 may be priced according to their class, with SLM chipsets 100 having higher MPLs priced higher than SLM chipsets 100 having lower MPLs. In this manner, customers may purchase lower-priced SLM chipsets 100 for applications where less brightness is adequate, such as a near-eye display or a HUD, or for applications that are price-sensitive. Customers that want high brightness, for applications such as home theater projectors, may purchase the SLM chipsets 100 that provide for 100% brightness with no restrictions. In some examples, controller 102 is configured to read the ID and then enforce the MPL associated with SLM chipsets 100 in the class indicated by the ID.

Figure 3:
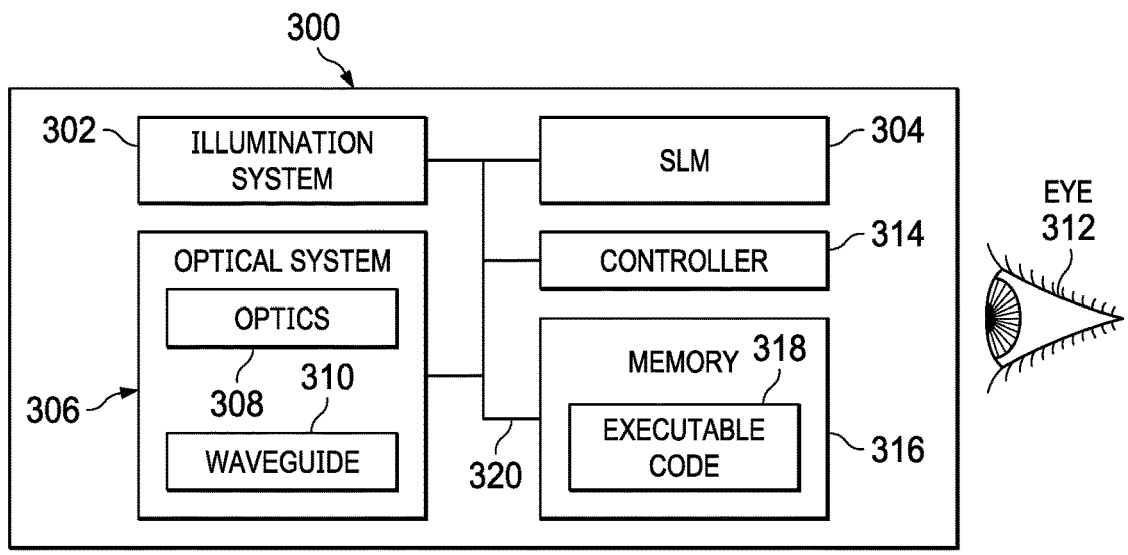
FIG. 3 is a block diagram of a near-eye display in accordance with various examples.

FIG. 3 is a block diagram of a near-eye display 300 in accordance with various examples herein. Near-eye display 300 may be an AR system that provides information in a portion of the field of view of the user, in some examples. Near-eye display 300 in this example includes an illumination system 302, an SLM 304, and an optical system 306. Optical system 306 includes optics 308 and a waveguide 310. An eye 312 of a user receives the image produced by near-eye display 300. One eye 312 is shown here for simplicity. In some near-eye displays 300, two images are produced, one image for each eye. Near-eye display 300 also includes controller 314 and memory 316. Executable code 318 may be stored in memory 316. Near-eye display 300 also includes bus 320. Bus 320 couples the components of near-eye display to one another and provides for communication between the components.

The illumination system 302 includes a light source (e.g., red, green, blue (RGB) LEDs) and illumination optics to guide light onto SLM 304. SLM 304 reflects the incoming light to create the image with the use of optical system 306. Optical system 306 is optically coupled to SLM 304, and is configured to project an image by collecting the light reflected off SLM 304 and directing it into eye 312. Near-eye display 300 forms a pupil, and eye 312 converts the light from near-eye display 300 into an image on the retina of eye 312. In one example, optics 308 provide the light to waveguide 310 in optical system 306. Optics 308 may include magnifying optics, pupil forming optics, and collimating optics in one example. The use of waveguide 310 allows for optics and illumination components to be located out of the field of view of eye 312, for example, on the side of the user's head. This orientation leaves only a relatively small, light, transparent waveguide optical element in front of the eye 312 that directs the image to eye 312. A near-eye display 300 such as this provides one example of a system where an SLM chipset 100 with reduced MPL may be used effectively.

Controller 314 and memory 316 operate similarly to controller 102 and memory 104 described with respect to FIG. 1 above. Controller 314 may be one or more controllers or one or more processors in some examples. Controller 314 may enforce an MPL for near-eye display 300 using any of the techniques described above. As described above, a near-eye display 300, in general, displays information on a limited portion of the display area, and/or displays information at a lower brightness level. Near-eye display 300 is used to augment a user's vision, but generally not to completely cover a user's field of view. A customer may therefore purchase an SLM chipset 100 with reduced MPL at a lower cost for near-eye display 300, which provides adequate performance for near-eye applications even though the MPL is limited.

In some examples, near-eye display 300 displays images to a user similar to image 204 or image 206 in FIG. 2A. With image 204, images may be displayed on a bottom portion of the display at full brightness, while no images are displayed on the upper portion of the display. With image 206, full brightness images may be displayed on certain portions of the user's field of view, as long as the total area of those portions of full brightness do not exceed the MPL. Alternatively, near-eye display 300 may display images similar to image 208, where information is displayed in a number of different locations within the field of view of the user. The information may be displayed at full brightness in some portions of the image, as long as the MPL is not exceeded.

Controller 314 may enforce the MPL using any of the techniques described herein. In one example, controller 314 may reduce brightness of certain portions of the displayed image so the total brightness remains below the MPL. In another example, dynamic range may be reduced in addition to, or rather than, reducing brightness. Controller 314 may enforce an MPL by limiting the number of MSBs sent to an SLM in one example. An MPL may be enforced by blanking the display in another example. In yet another example, power to LEDs 110 or another illumination source may be reduced to lower the brightness of the image below the MPL. Any other suitable method is useful to reduce the output of an illumination system in other examples.

Figure 4:
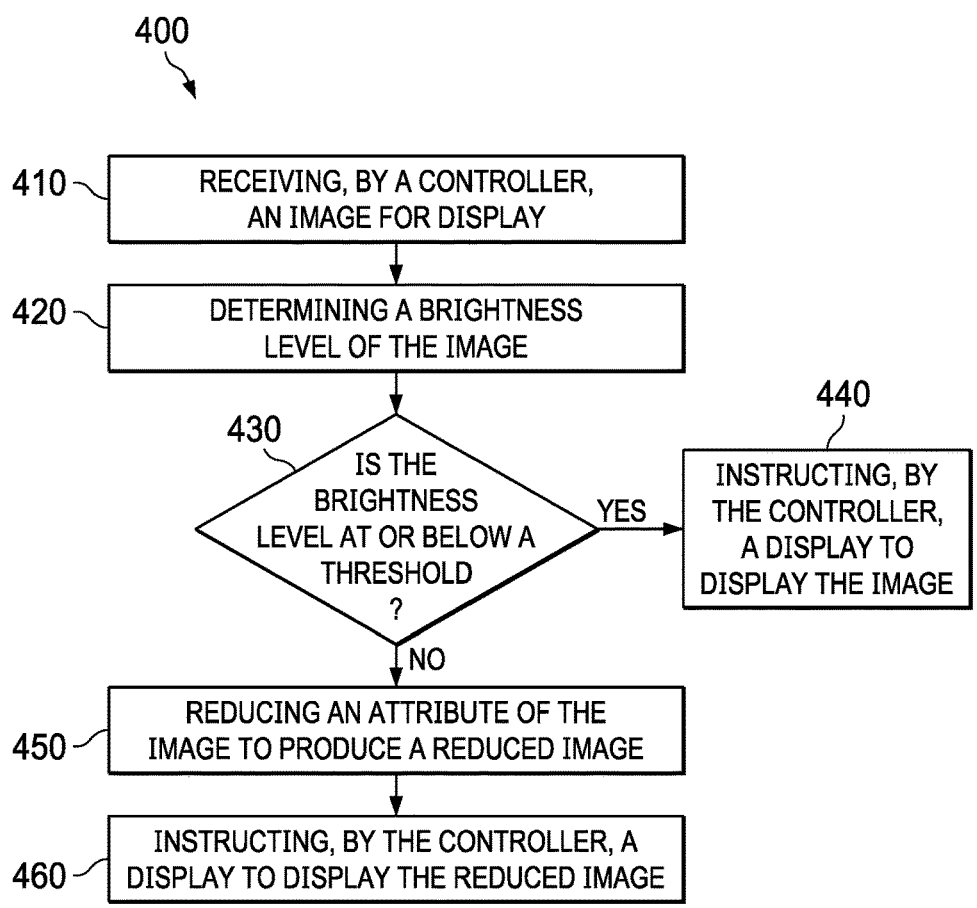
FIG. 4 is a flow diagram of a method for enforcing a brightness level of an image in accordance with various examples.

FIG. 4 is a flow diagram of a method 400 for enforcing a brightness level of an image in accordance with various examples herein. The steps of method 400 may be performed in any suitable order. The hardware components described above with respect to FIGS. 1 and 3 may perform method 400 in some examples, such as controller 102 or controller 314.

Method 400 begins at 410, where a controller receives an image. The image may be an image for display using an SLM in one example. The controller may be a controller such as controller 102 or controller 314 as described above. In an example, controller 102 or controller 314 receives each image for display and then provides instructions to other components of SLM chipset 100 so the image may be displayed.

Method 400 continues at 420, where a controller determines a brightness level of the image. The brightness level of the image may be determined using any suitable algorithm embodied in executable code as described above. In one example, a CAIC algorithm determines an APL of the image. In one example, the CAIC algorithm processes incoming data for a frame of an image. The CAIC algorithm generates an APL based on the average intensity of the pixels over the entire frame. The CAIC algorithm may also calculate the APL of each color in the frame. The APL provides an indication of the brightness level of the image. Other suitable algorithms are useful to determine a brightness level. In another example, the number of MSBs for the image is a measure of the brightness level of the image. Controller 102 may keep a count of the number of MSBs in the image to determine the brightness level as described above.

Method 400 continues at decision block 430. At decision block 430, the method determines if the brightness level is at or below a threshold. The threshold may be a brightness limit like an MPL, where the MPL is 25% or 50% of the maximum brightness of the display. In another example, the threshold is a certain number of MSBs in the image. In another example, the brightness level is set by determining an ID of the SLM, and then setting the brightness level based on the ID. The ID may denote the class of the SLM chipset as described above, with different classes having different brightness levels in some examples.

If the brightness level of the image is at or below the threshold, the method 400 proceeds to 440. At 440, the controller instructs a display to display the image. If the brightness level of the image is at or below the threshold, the image is displayed without altering the image. For example, if the APL of the image is below the MPL, as determined by controller 102, then the brightness level is at an acceptable level and the image is displayed without limit. In another example, if the number of MSBs in the image is below the allowable number of MSBs per image, the image is displayed without alteration.

If the brightness level of the image is above the threshold, the method 400 proceeds to 450. At 450, the controller reduces an attribute of the image to produce a reduced image. A controller, such as controller 102, may enforce the MPL using any of the techniques described herein to reduce an attribute of the image. In one example, controller 102 may reduce brightness of certain portions of the displayed image so the total brightness level remains below the MPL. Controller 102 may select the certain portions using any suitable technique. For example, if the pixels of the image are transmitted to the display as a sequence of bits, the first bits transmitted may be displayed normally, while the bits for later pixels may have their brightness reduced to remain below the MPL. In another example, one or more rules could be implemented to determine how to reduce brightness of certain portions. For example, images in the center of the display may be reduced in brightness first. Images toward the outer edges of the display are reduced in brightness next, and the process continues until the APL is below the MPL. In another example, brightness may be reduced starting on one edge of the display and moving toward the other edge of the display until the APL is below the MPL. In yet another example, dynamic range may be reduced in addition to, or rather than, reducing brightness. To reduce dynamic range, the brightest portions of the image may have their brightness reduced systematically until the APL of the entire image is below the MPL. In another example, the dynamic range may be reduced by reducing the brightness difference between the brightest portions and the darkest portions of the image, creating a washed-out look for the image. If the brightness level is above a first threshold, the dynamic range may be reduced until the dynamic range is below a second threshold. The first threshold may be based on the APL, while the second threshold may be based on a measure of the dynamic range of the image. Controller 102 may enforce an MPL by limiting the number of MSBs sent to an SLM in another example, as described above. In another example, an MPL may be enforced by blanking the display. In another example, power to LEDs or another illumination source may be reduced to lower the brightness level of the image. Any of the techniques described herein are useful to enforce the brightness level of the images for display.

Method 400 proceeds to 460, where the controller instructs a display to display the reduced image. The reduced image includes a reduced attribute, such as a brightness below the MPL or a reduced dynamic range.

In examples herein, SLM chipsets may be priced differently based on the intended application of the SLM chipset. SLM chipsets for high brightness applications may command a premium price due to enhanced power handling capabilities or expected device lifetimes, while SLM chipsets for lower brightness applications may be sold at a lower price. A controller in the SLM chipset may monitor the images for display and reduce the brightness level or reduce fidelity to ensure the brightness level of the image remains below a brightness limit. An SLM chipset may have an ID that identifies its capabilities (e.g., full brightness or limited brightness). The examples herein are not simple for a customer to defeat or bypass, and they would also rarely cause an SLM chipset to be falsely limited. Also, the examples herein introduce little to no additional costs on existing SLM chipsets, because existing SLM controllers use algorithms to monitor brightness, and these algorithms may be extended and/or modified to limit brightness for low brightness applications, in accordance with examples described herein.

In this description, the term "couple" may cover connections, communications, or signal paths that enable a functional relationship consistent with this description. For example, if device A provides a signal to control device B to perform an action, then (a) in a first example device A is directly coupled to device B, or (b) in a second example device A is indirectly coupled to device B through intervening component C if intervening component C does not substantially alter the functional relationship between device A and device B, so device B is controlled by device A via the control signal provided by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

Unless otherwise stated, "about," "approximately," or "substantially" preceding a value means+/−10 percent of the stated value. Modifications are possible in the described examples, and other examples are possible within the scope of the claims.

What is claimed is:

1. A method, comprising:
   receiving, by a controller, an image;
   determining an average pixel level (APL) of the image;
   reducing an attribute of the image responsive to the APL being above a maximum pixel level (MPL), to produce a reduced image; and
   instructing, by the controller, a display to display the reduced image.

2. The method of claim 1, wherein determining the APL of the image comprises:
   counting a number of most significant bits (MSBs) for the image.

3. The method of claim 2, wherein the display comprises a spatial light modulator, and wherein reducing the attribute of the image comprises:
   limiting the number of MSBs sent to the spatial light modulator.

4. The method of claim 1, wherein reducing the attribute of the image comprises:
   reducing the APL of the image to reduce the APL below the MPL.

5. The method of claim 4, wherein reducing the APL of the image comprises:
   reducing a brightness of one or more pixels in the image.

6. The method of claim 1, wherein the MPL is a first threshold, and wherein reducing the attribute of the image comprises:
   setting a dynamic range of the image below a second threshold.

7. The method of claim 1, further comprising:
   instructing, by the controller, the display to display the image responsive to the APL being at or below the MPL.

8. The method of claim 1, wherein reducing the attribute of the image comprises:
   reducing power provided to an illumination source.

9. The method of claim 1, wherein the display comprises a spatial light modulator (SLM) chipset comprising the controller and an SLM, the method further comprising determining the MPL based on an identifier (ID) of the SLM chipset.

10. A spatial light modulator (SLM) chipset, comprising:
    an SLM; and
    a controller coupled to the SLM, the controller configured to:
      receive an image;
      determine a brightness level of the image;
      determine a brightness limit based on an identifier of the SLM chipset, the identifier of the SLM chipset indicating full brightness or limited brightness of the SLM chipset;
      enforce the brightness limit on the image responsive to the brightness level, to produce a reduced image; and
      instruct the SLM to display the reduced image.

11. The SLM chipset of claim 10, wherein the controller is configured to determine the brightness level of the image by counting a number of most significant bits (MSBs) in the image.

12. The SLM chipset of claim 10, wherein the controller is configured to determine the brightness level of the image by measuring an average picture level (APL) of the image.

13. The SLM chipset of claim 10, wherein the controller is configured to enforce the brightness limit on the image for display by reducing an APL of the image.

14. The SLM chipset of claim 10, wherein the controller is configured to enforce the brightness limit on the image for display by limiting a number of MSBs of the image sent to the SLM.

15. The SLM chipset of claim 10, wherein the controller is configured to enforce the brightness limit on the image for display by reducing power provided to an illumination source for the display.

16. A near-eye display, comprising:
    an optical system; and
    a spatial light modulator (SLM) chipset comprising:
      an SLM optically coupled to the optical system; and
      a controller coupled to the SLM, the controller configured to:
        determine an identifier (ID) of the SLM chipset;
        obtain an image;
        determine a brightness level of the image;
        determine a brightness limit based on the ID of the SLM chipset;
        enforce the brightness limit on the image responsive to the brightness level, to produce a reduced image; and
        instruct the SLM to display the reduce image, wherein the SLM is configured to display the reduced image and the optical system is configured to project the displayed reduced image.

17. The near-eye display of claim 16, wherein the controller is configured to determine the brightness level of the image by counting a number of most significant bits (MSBs) in the image.

18. The near-eye display of claim 17, wherein the controller is further configured to determine the brightness level of the image by measuring an average picture level (APL) of the image.

19. The near-eye display of claim 18, wherein the controller is configured to enforce the brightness limit on the image by reducing the APL of the image, limiting the number of MSBs in the image, or reducing power to an illumination source of the SLM.

20. The near-eye display of claim 16, wherein the ID of the SLM chipset indicates a maximum picture level for the SLM.

* * * * *